(12) United States Patent
Tanaka

(10) Patent No.: US 6,919,994 B2
(45) Date of Patent: Jul. 19, 2005

(54) ZOOM LENS INCLUDING AT LEAST FOUR ASPHERIC SURFACES

(75) Inventor: Takashi Tanaka, Kawagoe (JP)

(73) Assignee: Fujinon Corporation, Saitama (JP)

(*) Notice: Subject to any disclaimer, the term of this patent is extended or adjusted under 35 U.S.C. 154(b) by 0 days.

(21) Appl. No.: 10/810,708

(22) Filed: Mar. 29, 2004

(65) Prior Publication Data
US 2004/0196572 A1 Oct. 7, 2004

(30) Foreign Application Priority Data
Mar. 31, 2003 (JP) ........................ 2003-097082

(51) Int. Cl.$^7$ ............................ G02B 15/177
(52) U.S. Cl. ..................... 359/689; 359/676
(58) Field of Search ................. 359/676, 683, 359/686, 689

(56) References Cited

U.S. PATENT DOCUMENTS

| | | |
|---|---|---|
| 6,349,002 B1 | 2/2002 | Shibayama et al. |
| 6,614,599 B1 * | 9/2003 | Watanabe ............ 359/689 |
| 6,804,064 B2 * | 10/2004 | Hirakawa ............ 359/682 |
| 6,819,499 B2 * | 11/2004 | Watanabe ............ 359/689 |
| 6,822,808 B2 * | 11/2004 | Nanba et al. ......... 359/689 |
| 6,862,143 B2 * | 3/2005 | Hoshi et al. ......... 359/689 |

| | | |
|---|---|---|
| 2002/0149857 A1 | 10/2002 | Nobe |
| 2003/0072085 A1 | 4/2003 | Mizuguchi et al. |
| 2003/0227691 A1 | 12/2003 | Saruwatari |

FOREIGN PATENT DOCUMENTS

| | | |
|---|---|---|
| JP | 10-293253 | 11/1998 |
| JP | 2000-284177 | 10/2000 |
| JP | 2002-196240 | 7/2002 |

* cited by examiner

Primary Examiner—Scott J. Sugarman
Assistant Examiner—Darryl J. Collins
(74) Attorney, Agent, or Firm—Arnold International; Jon W. Henry; Bruce Y. Arnold

(57) ABSTRACT

A zoom lens includes, in order from the object side, a first lens group of negative refractive power, and second and third lens groups, each of positive refractive power. The second lens group includes a stop on its object side. Each of the first and second lens groups includes negative and positive refractive power elements and at least two aspheric surfaces. The third lens group is a single lens component. All but one lens component may be a single lens element. When zooming from the wide-angle end to the telephoto end, the first and second lens groups move closer together while the second lens group moves farther from the third lens group. The third lens group moves for focusing but not for zooming. The zoom lens satisfies specified conditions which insure compactness of the zoom lens when not in use, high-speed focusing, favorable correction of various aberrations, and bright images.

20 Claims, 3 Drawing Sheets

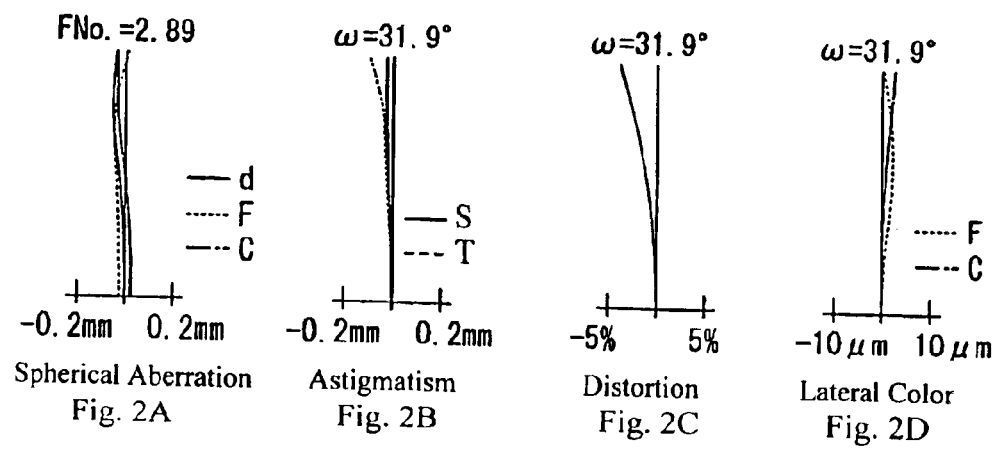
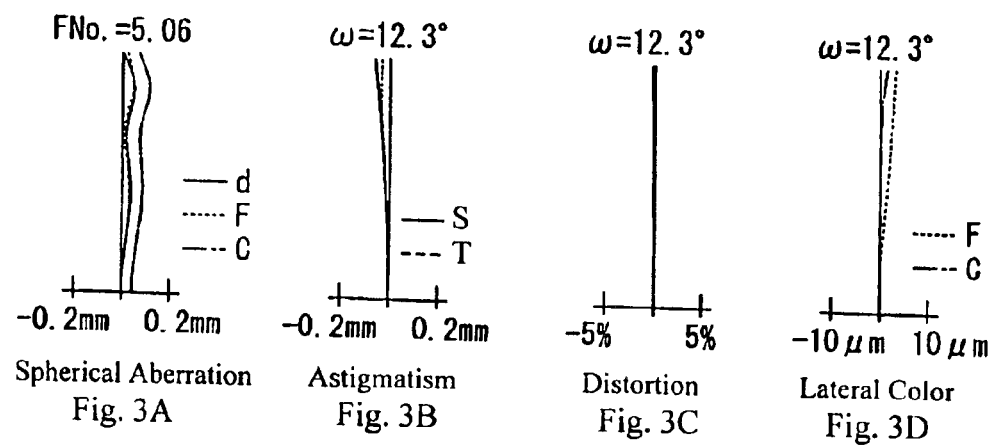

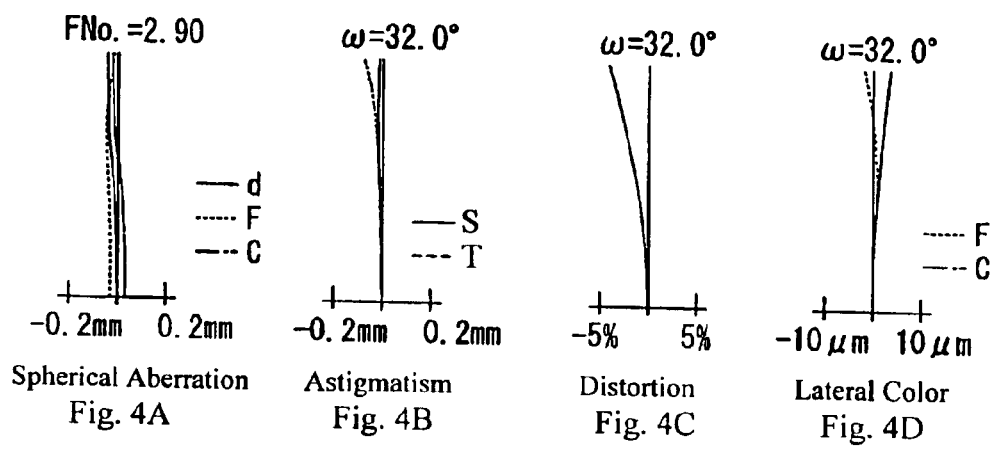
Fig. 4A Spherical Aberration
Fig. 4B Astigmatism
Fig. 4C Distortion
Fig. 4D Lateral Color
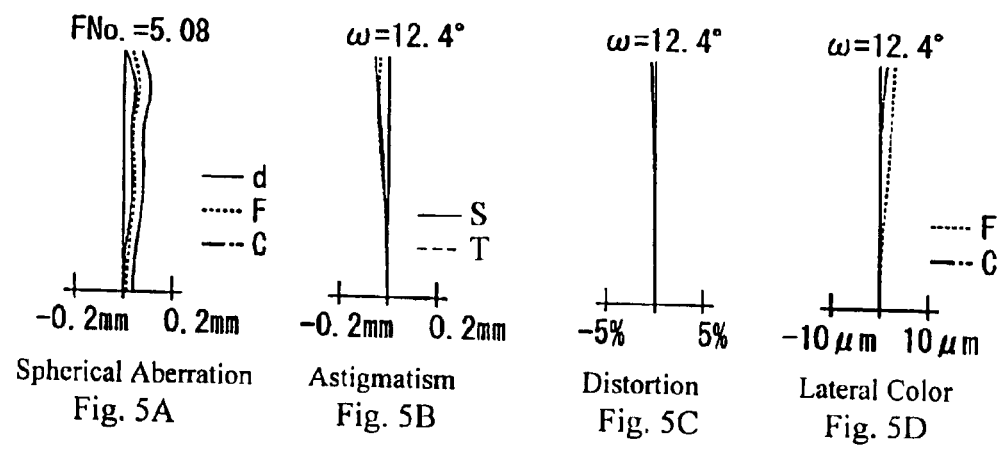
Fig. 5A Spherical Aberration
Fig. 5B Astigmatism
Fig. 5C Distortion
Fig. 5D Lateral Color

ZOOM LENS INCLUDING AT LEAST FOUR ASPHERIC SURFACES

BACKGROUND OF THE INVENTION

In recent years, digital still cameras (hereafter referred to simply as digital cameras) and video cameras have become remarkably popular. In these cameras, an optical image is converted into electrical signals using an image pickup device, such as a CCD (charge coupled device), and the signals are recorded as image data.

As a zoom lens used for these cameras, various lenses have been previously proposed. When the desired zoom ratio is approximately three, a zoom lens that has a two-group or three-group construction is widely used. In order to obtain a lightweight lens and high-speed autofocus, an inner-focus format or a rear-focus format is preferred. In implementing these features, a three-group construction is used instead of a two-group construction. The applicant of the present invention has proposed zoom lenses with such construction in Japanese Laid-Open Patent Applications H10-293253 and 2000-284177.

The three-group zoom lens of Japanese Laid-Open Patent Application H10-293253 includes, in order from the object side, lens groups of negative, positive, and positive refractive powers with zooming performed by movement of only the object side and middle lens groups, while focusing is performed mainly by movement of the image-side lens group. The zoom lens satisfies two conditions for obtaining a desired distance along an optical axis between an image plane and the exit pupil in order to enable an appropriate zooming ratio, a light flux that strikes the image plane in a substantially telecentric relationship, and imaging without substantial vignetting.

The three-group zoom lens of Japanese Laid-Open Patent Application 2000-284177 performs zooming by moving all three lens groups with the middle and image-side lens groups moving together toward the object side, when infinity focus is maintained, from the wide-angle end to the telephoto end so that they become closer to the object-side lens group. In this zoom lens, the distance along the optical axis between the image plane and the exit pupil remains appropriate with the rear-focus format.

The three-group zoom lens of Japanese Laid-Open Patent Application 2002-196240 includes, in order from the object side, lens groups of negative, positive, and positive refractive powers. The middle lens group includes, in order from the object side, a lens element having positive refractive power that is a lens component, a lens component that includes a lens element that has positive refractive power cemented to a lens element having negative refractive power, and another lens component that is a lens element. When zooming from the wide-angle end to the telephoto end, all three lens groups move with the middle lens group becoming closer to the object-side lens group and farther from the image-side lens group. The image-side lens group acts as a variator to adjust the position of the image plane along the optical axis due to zooming.

In recent years, with digital cameras generally, a lens with an f-number $F_{NO}$ of approximately 2.8 and high image resolution has been desired. Additionally, further miniaturization of the digital cameras generally is also desired, which may be accomplished by miniaturizing the zoom lens that affects the overall size of the digital camera. Furthermore, CCD's for use in digital cameras where the total number of pixels is beyond five million have been developed, and because the trend is that the number of pixels will increase in the future, a much higher image resolution is required for zoom lenses used in digital cameras generally.

However, with the zoom lenses disclosed in the above-mentioned Japanese Laid-Open Patent Applications H10-293253 and 2000-284177, the f-number at the wide-angle end is limited to about 3.2 or higher, so that brighter (smaller f-number) lenses may be required for various uses. Also, in the zoom lens disclosed in Japanese Laid-Open Patent Application H10-293253, the object-side lens group includes four lens elements, so that further improvement in compactness and a lighter weight of the zoom lens is required. Additionally, in the zoom lens disclosed in Japanese Laid-Open Patent Application 2000-284177, the middle and image-side lens groups move as a unit together during zooming, and that tends to make the entire length of the zoom lens longer at the wide-angle end, making it more difficult to obtain a desired zoom ratio while maintaining overall compactness of the zoom lens.

Although the zoom lens disclosed in Japanese Laid-Open Patent Application 2002-196240 provides a bright image with an f-number of approximately 2.8, the image-side lens group, as well as the object-side and middle lens groups, move during zooming. With this construction, the refractive power of the image-side lens group becomes relatively large. As a result, the eccentric sensitivity (the degree of optical performance deterioration due to the eccentricity of alignment of the lens elements) becomes great. In particular, many recently made digital cameras are constructed for greater miniaturization so that the zoom lens fully retracts or collapses to a very short overall length when not in use. In zoom lenses like the one disclosed in Japanese Laid-Open Patent Application 2002-196240, the object-side and middle lens groups are mechanically secured by one cam cylinder. The image-side lens group is independently secured and thus performance deterioration due to the eccentricity of the image-side lens group easily becomes a problem. On the other hand, if the object-side and image-side lens groups were to be secured by one cam cylinder, eccentricity of the image-side lens group relative to the other two lens groups might be restrained, but it becomes difficult for the zoom lens to be made collapsible to a short overall length.

In addition, in the zoom lenses disclosed in all three of the above-mentioned Japanese applications, although substantial correction of aberrations is achieved, higher correction is required in response to the recent demand for higher image resolution.

BRIEF SUMMARY OF THE INVENTION

The present invention relates to a zoom lens that has a small f-number at the wide-angle end in order to provide a bright image at the wide-angle end, that enables high-speed focusing, that excellently corrects aberrations in order to provide a high resolution image that is suitable for image pickup devices having a large number of pixels, and that has a small and simplified construction. Additionally, the present invention relates particularly to a zoom lens suitable for digital cameras and video cameras.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion, and lateral color, respectively, of the zoom lens according to Embodiment 1 at the wide-angle end;

FIGS. 3A–3D show the spherical aberration, astigmatism, distortion, and lateral color, respectively, of the zoom lens according to Embodiment 1 at the telephoto end;

FIGS. 4A–4D show the spherical aberration, astigmatism, distortion, and lateral color, respectively, of the zoom lens according to Embodiment 2 at the wide-angle end; and FIGS. 5A–5D show the spherical aberration, astigmatism, distortion, and lateral color, respectively, of the zoom lens according to Embodiment 2 at the telephoto end.

DETAILED DESCRIPTION

Figure 1:
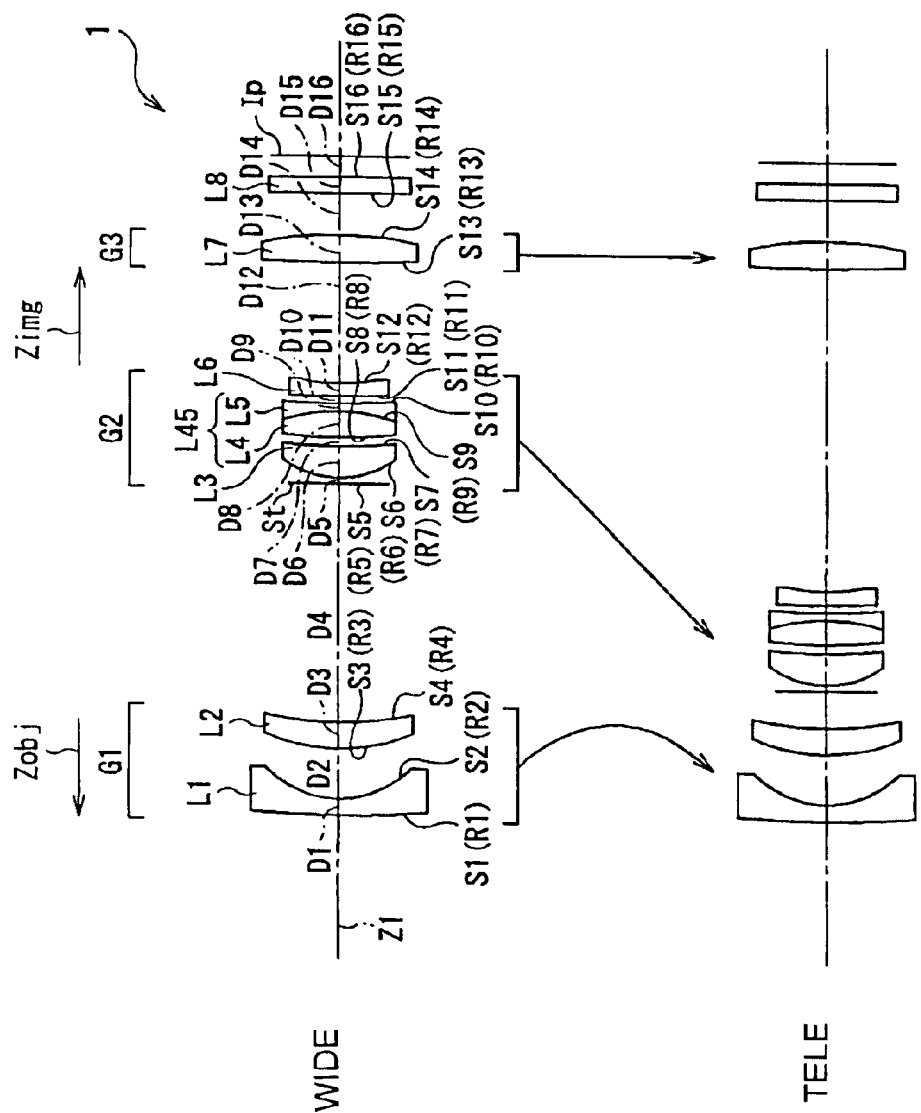
FIG. 1 shows a cross-sectional view of the zoom lens according to Embodiment 1 at the wide-angle end (WIDE) and at the telephoto end (TELE)

A general description of the zoom lens of the present invention will first be described with reference to FIG. 1 that shows Embodiment 1. In FIG. 1, optical elements are referenced by the letter L followed by a number denoting their order from the object side of the zoom lens along the optical axis Z1, from L1 to L8. The on-axis surface spacings of the various optical surfaces are referenced by the letter D followed by a number denoting their order from the object side of the zoom lens along the optical axis Z1, from D1 to D16. Similarly, optical element surfaces, including the lens surfaces, are referenced by the letter S followed by a number denoting their order from the object side of the zoom lens, from S1 to S16, and the radii of curvature of the optical element surfaces, including lens surfaces, are referenced by the letter R followed by a number denoting their order from the object side of the zoom lens, from R1 to R16, that parenthetically accompany the lens surface references. In the same manner, the three lens groups are labeled G1, G2, and G3 in order from the object side of the zoom lens and the lens elements belonging to each lens group are indicated by upper brackets adjacent the labels G1–G3.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is used herein to define an assembly of one or more lens components in optical series and with no intervening lens components that, during zooming, is movable as a single unit relative to other lens components. Thus, for example, in a zoom lens, a lens group may be stationary or movable with respect to an image plane of the lens group, and stationary lens elements of the zoom lens may define different lens groups based on these different lens groups being separated by lens groups that move relative to these different lens groups and the image plane. More specifically, as an example, a lens group at the object side and a lens group at the image side of a zoom lens may be stationary, but they are not part of the same lens group because they are separated by other lens components that belong to other lens groups.

The top portion of FIG. 1 shows the zoom lens 1 at the wide-angle end of the zoom range and the bottom portion of FIG. 1 shows the zoom lens 1 at the telephoto end of the zoom range. As shown in FIG. 1, the zoom lens 1 is a three-group zoom lens that includes, arranged along the optical axis Z1 in order from the object side, a first lens group G1 of negative refractive power, a second lens group G2 of positive refractive power, and a third lens group G3 of positive refractive power. A diaphragm stop St that operates as an aperture stop is arranged on the object side of the second lens group G2. In FIG. 1, a horizontal arrow below the symbol Zobj points in one direction in order to indicate the object side of the zoom lens 1 and a horizontal arrow below the symbol Zimg points in the opposite direction in order to indicate the image side of the zoom lens 1. An image pickup device, such as a CCD (not shown), is arranged at an image plane Ip. A low-pass filter or cover glass L8 is arranged between the third lens group G3 and the image plane Ip.

The zoom lens of the present invention is particularly suitable for use in a compact digital camera or in a video camera. As shown in FIG. 1, the first and second lens groups, G1 and G2, are movable lens groups and the third lens group G3 is a fixed lens group. More specifically, when performing zooming while maintaining the focus at infinity, the distance along the optical axis Z1 from the third lens group G3 to the image plane Ip remains substantially constant. When performing zooming from the wide-angle end to the telephoto end, the first and second lens groups become closer together, with first lens group G1 following a concave path as shown schematically in cross-section in FIG. 1. Meanwhile, second lens group G2 follows a straight line path as shown schematically in cross-section in FIG. 1, so as to monotonically increase its distance from the third lens group G3. The third lens group G3 moves toward the object side Zobj when changing the focus from infinity to a near point.

The zoom lens 1 is designed to minimize the number of lens elements and make the zoom lens as small as possible. Simultaneously, it provides excellent correction of various aberrations. In particular, using at least two aspheric lens surfaces among the lens surfaces of each of the first lens group G1 and the second lens group G2 especially aids in miniaturization of the zoom lens and in correction of various aberrations. Additionally, by zooming with only the first two lens groups G1 and G2 and focusing with only the third lens group G3 and by using a separate zoom mechanism and a separate focusing mechanism, it is comparatively easy to construct the zoom lens to be collapsible with the separation of the lens groups minimized by interlocking a zoom motor and a focus motor (not shown in the drawings).

The lens surfaces that are aspheric satisfy the following equation:

$$Z=\{(Y^2/R)/[1+\{1-(1+K)\cdot Y^2/R^2\}^{1/2}]\}+\Sigma(A_i\cdot Y^i) \qquad \text{Equation (A)}$$

where

Z is the length (in mm) of a line drawn from a point on the aspheric lens surface at a distance Y from the optical axis to the tangential plane of the aspheric surface vertex, R is the radius of curvature of the aspheric lens surface on the optical axis, Y is the distance (in mm) from the optical axis, K is the eccentricity, and $A_i$ is the ith aspheric coefficient and the summation extends over i.

In embodiments of the invention disclosed below, only aspheric coefficients $A_4$, $A_6$, $A_8$, and $A_{10}$ are non-zero.

The zoom lens of the present invention satisfies the following conditions:

$0.4 < f_w/|f_1| < 0.6$                                Condition (1)

$0.25 < f_2/f_3 < 0.45$                              Condition (2)

where $f_w$ is the focal length of the entire zoom lens at the wide-angle end, $f_1$ is the focal length of the first lens group G1, $f_2$ is the focal length of the second lens group G2, and $f_3$ is the focal length of the third lens group G3.

Satisfying Condition (1) provides the first lens group G1 a proper amount of the total refractive power of the zoom lens that enables miniaturization, balancing of contributions to various aberrations that provides good correction, and obtaining a bright image. If the ratio of Condition (1) is smaller than the lower limit of Condition (1), the entire length of the zoom lens at the wide-angle end becomes longer, and miniaturization cannot be achieved. On the other hand, if the ratio of Condition (1) is larger than the upper limit of Condition (1), the refractive power of the first lens group G1 becomes too great, which prevents good correction of distortion aberration and lateral color at the wide-angle end and spherical aberration at the telephoto end, especially if the first lens group includes only two lens components, and particularly if each lens component is a lens element.

If the ratio of Condition (2) is smaller than the lower limit of Condition (2), the refractive power of the third lens group G3 is too small, requiring greater movement of the third lens group G3 along the optical axis in order to focus the zoom lens. As a result, it becomes difficult to realize high-speed focusing. On the other hand, if the ratio of Condition (2) is larger than the upper limit of Condition (2), the refractive power of the third lens group G3 is too large, and it becomes difficult to construct the third lens group G3 with one lens component, particularly one lens element, which makes miniaturizing the zoom lens difficult. Additionally, in this case, the eccentric sensitivity of the third lens group G3 becomes too great and results in the optical performance of the zoom lens deteriorating when mechanisms are installed to make the zoom lens highly retractable or collapsible when not in use.

The first lens group G1 has negative refractive power as a whole and, as shown in FIG. 1, includes, arranged in order from the object side along the optical axis Z1, a first lens element L1 having negative refractive power and a second lens element L2 having positive refractive power. At least two surfaces among the surfaces S1 through S4 of the first lens group G1 are aspheric surfaces. It is preferable that the first lens element L1 have a concave surface on the image side with a greater absolute value of curvature than the other lens surface of the first lens element L1, and that at least one of the surfaces of the first lens element L1 be aspheric. As shown in FIG. 1, the second lens element L2 is a meniscus lens element having positive refractive power with its convex surface on the object side.

Preferably, the zoom lens satisfies the following conditions:

$N_{d1} > 1.72$                                             Condition (3)

$v_{d1} - v_{d2} > 14$                                  Condition (4)

where $N_{d1}$ is the refractive index at the d-line ($\lambda$=587.6 nm) of the lens material of lens element L1, $v_{d1}$ is the Abbe number at the d-line ($\lambda$=587.6 nm) of the lens material of lens element L1, and $v_{d2}$ is the Abbe number at the d-line ($\lambda$=587.6 nm) of the lens material of lens element L2.

If Condition (3) is not satisfied, because the surface curvatures must me stronger for the lens L1, it becomes difficult to correct astigmatism and distortion at the wide-angle end, even if an aspheric surface is used. More preferably, the limit of Condition (3) is 1.90.

If Condition (4) is not satisfied, it becomes difficult to sufficiently control lateral color at the wide-angle end and fluctuations in axial chromatic aberration during zooming. More preferably, the limit of Condition (4) is 35.

The second lens group G2 has positive refractive power as a whole. As shown in FIG. 1, the second lens group G2 has a diaphragm stop St that controls the quantity of light and includes, arranged in order from the object side along an optical axis Z1, a third lens element L3 having positive refractive power, a fourth lens element L4 having positive refractive power that is intimately bonded to a fifth lens element L5 having negative refractive power, and a sixth lens element L6. The term "intimately bonded" is defined herein generally to mean that adjacent refractive surfaces of two lens elements have substantially the same curvature and are held in direct fixed contact or are separated by a thin layer of transparent adhesive (too thin to be considered in optical computations) that fixes the lens elements together, the latter being commonly referred to as a "cemented" lens element arrangement. The stop St is arranged on the object side of the third lens element L3.

At least two surfaces among the surfaces S6 through S12 of the second lens group G2 are aspheric surfaces. In particular, it is preferable that at least one surface of either the surface S6 or the surface S7 of the third lens element L3 be aspheric. In the sixth lens element L6, it is preferable that a concave surface, which has a greater absolute value of curvature than the other lens surface of the lens element L6, is on the image side, and also it is preferable that at least one surface of either the surface S11 or the surface S12 be aspheric. More preferably, both surfaces of the sixth lens element L6 are aspheric. Thus, for example, all four surfaces S6, S7, S11 and S12 may be aspheric.

More preferably, the zoom lens satisfies the following conditions:

$(N_{d3} + N_{d4})/2 > 1.65$                        Condition (5)

$v_{d4} - v_{d5} > 20$                                  Condition (6)

where $N_{d3}$ is the refractive index at the d-line ($\lambda$=587.6 nm) of the lens material of lens element L3, $N_{d4}$ is the refractive index at the d-line ($\lambda$=587.6 nm) of the lens material of lens element L4, $v_{d4}$ is the Abbe number at the d-line ($\lambda$=587.6 nm) of the lens material of lens element L4, and $v_{d5}$ is the Abbe number at the d-line ($\lambda$=587.6 nm) of the lens material of lens element L5.

If Condition (5) is not satisfied, the Petzval sum becomes too great, and even if an aspheric surface is used, it becomes difficult to correct astigmatism and the curvature of field aberration. Even more preferably, the limit of Condition (5) is 1.90.

If Condition (6) is not satisfied, it becomes difficult to sufficiently control lateral color at the wide-angle end and fluctuations in axial chromatic aberration during zooming. Even more preferably, the limit of Condition (6) is 40.

By satisfying Conditions (5) and (6), various aberrations over the entire range of zoom can be reduced. Therefore, it is possible to favorably correct various aberrations to an extent that a high resolution image, matched to the high resolution of an image pickup device having a large number of pixels, can be achieved.

The third lens group G3 may be constructed of a single biconvex lens L7.

As explained above, when zooming the zoom lens of the present invention, the third lens group G3 remains stationary and only the first lens group G1 and the second lens group G2 move. That is, the third lens group G3 performs no zooming function. Therefore, the refractive power of the third lens group G3 relative to the entire zoom lens can be relatively small. As a result, the eccentric sensitivity of the lens group G3 can be kept low. Consequently, by having the first lens group G1 and the second lens group G2 being driven by one cam cylinder and the third lens group G3 separately controlled, there is little deterioration of optical performance with movements of the lens elements because the eccentric sensitivity of the third lens group G3 is small. Additionally, because only the first lens group G1 and the second lens group G2 are movable for zooming, the mechanism for moving the lens groups becomes simple compared to when all the lens groups move for zooming. In addition, the zoom lens of the present invention, allows for a highly collapsible (i.e., retractable) zoom lens structure when the zoom lens is not in use, which is desirable, for example, in cameras.

Embodiments 1 and 2 of the present inventions will now be individually described with further reference to the drawings. In the following descriptions, references will be frequently made to a "lens element." However, as set forth above, it is understood that lens elements described below are also lens components and may be replaced by lens components that include more than one lens element.

Embodiment 1

Table 1 below lists the surface number #, in order from the object side, the radius of curvature R (in mm) of each surface near the optical axis, the on-axis surface spacing D (in mm) between surfaces, as well as the refractive index $N_d$ and the Abbe number $v_d$ (at the d-line of 587.6 nm) of each optical element for Embodiment 1. Listed in the bottom portion of Table 1 are the focal length f and the f-number $F_{NO}$ at the wide-angle and telephoto ends, and the maximum field angle $2\omega$ at the wide-angle end and the telephoto end for Embodiment 1.

TABLE 1

| # | R | D | $N_d$ | $v_d$ |
|---|---|---|---|---|
| 1* | 79.214 | 1.20 | 1.80610 | 40.7 |
| 2* | 6.467 | 3.59 | | |
| 3 | 12.634 | 1.91 | 1.92285 | 20.9 |
| 4 | 24.050 | D4 (variable) | | |
| 5 | ∞ (stop) | 0.40 | | |
| 6* | 6.617 | 2.28 | 1.69350 | 53.2 |
| 7* | 41.418 | 0.65 | | |
| 8 | 36.304 | 1.78 | 1.71300 | 53.9 |
| 9 | −14.000 | 0.55 | 1.84665 | 23.9 |
| 10 | 49.614 | 0.53 | | |
| 11* | 857.306 | 1.00 | 1.72249 | 29.2 |
| 12* | 25.755 | D12 (variable) | | |
| 13 | 91.393 | 1.92 | 1.48749 | 70.4 |
| 14 | −26.397 | D14 (variable) | | |
| 15 | ∞ | 1.08 | 1.51680 | 64.2 |
| 16 | ∞ | 1.00 | | | f = 8.00 − 22.01 mm
$F_{NO}$ = 2.89 − 5.06
$2\omega$ = 63.9° − 24.7°

The lens surfaces with a * to the right of the surface number in Table 1 are aspheric lens surfaces, and the aspheric surface shape of these lens elements is expressed by Equation (A) above.

Table 2 below lists the values of the constants K, $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ | $A_{10}$ |
|---|---|---|---|---|---|
| 1 | 0.00679 | 1.17107E−4 | −4.75153E−6 | 8.18901E−8 | −5.81788E−10 |
| 2 | −2.97160 | 1.22469E−3 | −2.34701E−5 | 3.87317E−7 | −3.25219E−9 |
| 6 | 0.28504 | −6.39013E−5 | −1.47297E−6 | −5.95988E−8 | −6.68611E−9 |
| 7 | 0.06223 | 2.62958E−4 | −3.42243E−6 | −3.38805E−7 | −2.88129E−10 |
| 11 | −7.84343 | 1.68951E−3 | −8.33833E−5 | −2.64899E−6 | −1.06940E−8 |
| 12 | 3.45181 | 2.76552E−3 | −3.84376E−5 | −1.51248E−6 | −4.20761E−9 |

In the zoom lens of Embodiment 1, lens groups G1 and G2 move to vary their separations, and the separation of lens group G2 from lens group G3 also changes during zooming. Therefore, the values of the on-axis spacings D4 and D12 vary. Table 3 below lists the values of the variables D4 and D12 (i.e., the on-axis spacings) at the wide-angle end (Wide-Angle) and at the telephoto end (Telephoto). The on-axis spacing D14 that does not vary for zooming at an infinity focus is also given in Table 3 below. This spacing is also labeled as variable in Table 1 above because the lens group G3 is movable for focusing. The distance between the image-side surface of the lens group G3 and the image plane Ip also remains constant during zooming at a value of 5.61 mm. As indicated in Table 1, the focal length of the zoom lens of Embodiment 1 at the wide-angle end is 8.00 mm and at the telephoto end is 22.01 mm, which corresponds to a zoom ratio of approximately 2.75.

TABLE 3

| # | Wide-Angle | Telephoto |
|---|---|---|
| D4 | 17.03 | 2.60 |
| D12 | 8.56 | 23.00 |
| D14 | 3.53 | 3.53 |

The zoom lens of Embodiment 1 of the present invention satisfies Conditions (1)–(6) above as set forth in Table 4 below.

TABLE 4

| Condition No. | Condition | Value |
|---|---|---|
| (1) | $0.4 < f_w/|f_1| < 0.6$ | 0.52 |
| (2) | $0.25 < f_2/f_3 < 0.45$ | 0.32 |
| (3) | $N_{d1} > 1.72$ | 1.81 |
| (4) | $v_{d1} - v_{d2} > 14$ | 19.8 |
| (5) | $(N_{d3} + N_{d4})/2 > 1.65$ | 1.70 |
| (6) | $v_{d4} - v_{d5} > 20$ | 30.0 |

FIGS. 2A–2D show the spherical aberration, astigmatism, distortion, and lateral color, respectively, of the zoom lens of Embodiment 1 at the wide-angle end. FIGS. 3A–3D show the spherical aberration, astigmatism, distortion, and lateral color, respectively, of the zoom lens of Embodiment 1 at the telephoto end. For this embodiment, as shown in FIG. 2A, at the wide-angle end, the f-number, denoted as FNo., is 2.89 and, as shown in FIGS. 2B–2D, the half-field angle ω is 31.9°. Additionally, for this embodiment, as shown in FIG. 3A, at the telephoto end, the f-number, denoted as FNo., is 5.06 and, as shown in FIGS. 3B–3D, the half-field angle ω is 12.3°. In FIGS. 2A and 3A, the spherical aberration is shown for the d-line (λ=587.6 nm), the F-line (λ=486.1 nm), and the C-line (λ=656.3 nm). In FIGS. 2B and 3B, the astigmatism is shown at the d-line (λ=587.6 nm) for both the sagittal image surface S and the tangential image surface T. In FIGS. 2C and 3C, distortion is measured at the d-line (λ=587.6 nm). In FIGS. 2D and 3D, the lateral color is shown at the F-line (λ=486.1 nm), and the C-line (λ=656.3 nm) relative to the d-line (λ=587.6 nm). As is apparent from these figures, the various aberrations are favorably corrected over the entire zoom range.

Embodiment 2

Embodiment 2 is very similar to Embodiment 1 and therefore only the differences between Embodiment 2 and Embodiment 1 will be explained. Embodiment 2 differs from Embodiment 1 in its lens element configuration only by different radii of curvature of the lens surfaces, different eccentricities and aspheric coefficients of the aspheric lens surfaces, some different optical element surface spacings, and some different refractive indexes and Abbe numbers of the materials of the lens elements. In particular, in Embodiment 2, lens surfaces S7 and S8 have negative radii of curvature rather than positive radii of curvature as in Embodiment 1.

Table 5 below lists the surface number #, in order from the object side, the radius of curvature R (in mm) of each surface near the optical axis, the on-axis surface spacing D (in mm) between surfaces, as well as the refractive index $N_d$ and the Abbe number $v_d$ (at the d-line of 587.6 nm) of each optical element for Embodiment 2. Listed in the bottom portion of Table 5 are the focal length f and the f-number $F_{NO}$ at the wide-angle and telephoto ends, and the maximum field angle 2ω at the wide-angle end and telephoto end for Embodiment 2.

TABLE 5

| # | R | D | $N_d$ | $v_d$ |
|---|---|---|---|---|
| 1* | 122.385 | 1.20 | 1.78799 | 47.5 |
| 2* | 6.628 | 3.69 | | |
| 3 | 12.656 | 1.92 | 1.80517 | 25.4 |
| 4 | 27.326 | $D_4$ (variable) | | |
| 5 | ∞ (stop) | 0.40 | | |
| 6* | 6.558 | 2.46 | 1.69350 | 53.2 |
| 7* | −114.370 | 0.48 | | |
| 8 | −441.380 | 1.63 | 1.72000 | 50.3 |
| 9 | −14.892 | 0.55 | 1.84665 | 23.9 |
| 10 | 44.943 | 0.56 | | |
| 11* | 999.779 | 1.00 | 1.72249 | 29.2 |
| 12* | 21.416 | $D_{12}$ (variable) | | |
| 13 | 312.978 | 1.93 | 1.48749 | 70.4 |
| 14 | −21.584 | $D_{14}$ (variable) | | |
| 15 | ∞ | 1.08 | 1.51680 | 64.2 |
| 16 | ∞ | 1.00 | | | f = 8.00 − 22.01 mm
$F_{NO}$ = 2.90 − 5.08
2ω = 64.1° − 24.7°

The lens surfaces with a * to the right of the surface number in Table 5 are aspheric lens surfaces, and the aspheric surface shape of these lens elements is expressed by Equation (A) above.

Table 6 below lists the values of the constants K, $A_4$, $A_6$, $A_8$, and $A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_4$ | $A_6$ | $A_8$ | $A_{10}$ |
|---|---|---|---|---|---|
| 1 | 0.00000 | 1.27226E−4 | −4.24279E−6 | 6.91615E−8 | −4.59010E−10 |
| 2 | −2.97652 | 1.16035E−3 | −1.98461E−5 | 2.92160E−7 | −1.87580E−9 |
| 6 | −2.05687 | 9.12632E−4 | 1.28449E−6 | 1.76127E−7 | −6.06308E−9 |
| 7 | 0.00000 | 2.19604E−4 | −1.40534E−6 | −3.97562E−7 | −5.92886E−10 |
| 11 | −7.84182 | 1.91476E−3 | −8.33168E−5 | −2.79911E−6 | −1.41343E−8 |
| 12 | 3.04364 | 3.08541E−3 | −2.91028E−5 | −1.96259E−6 | −6.18603E−9 |

In the zoom lens of Embodiment 2, lens groups G1 and G2 move to vary their separations, and the separation of lens group G2 from lens group G3 also changes during zooming. Therefore, the values of the on-axis spacings D4 and D12 vary. Table 7 below lists the values of the variables D4 and D12 (i.e., the on-axis spacings) at the wide-angle end (Wide-Angle) and at the telephoto end (Telephoto). The on-axis spacing D14 that does not vary for zooming at an infinity focus is also given in Table 7 below. This spacing is also labeled as variable in Table 5 above because the lens group G3 is movable for focusing. The distance between the image-side surface of the lens group G3 and the image plane Ip also remains constant during zooming at a value of 5.60 mm. As indicated in Table 5, the focal length of the zoom lens of Embodiment 2 at the wide-angle end is 8.00 mm and at the telephoto end is 22.01 mm, which corresponds to a zoom ratio of approximately 2.75.

TABLE 7

| # | Wide-Angle | Telephoto |
|---|---|---|
| D4 | 17.24 | 2.54 |
| D12 | 8.35 | 22.53 |
| D14 | 3.52 | 3.52 |

The zoom lens of Embodiment 2 of the present invention satisfies Conditions (1)–(6) above as set forth in Table 8 below.

TABLE 8

| Condition No. | Condition | Value |
|---|---|---|
| (1) | $0.4 < f_w/|f_1| < 0.6$ | 0.52 |
| (2) | $0.25 < f_2/f_3 < 0.45$ | 0.33 |
| (3) | $N_{d1} > 1.72$ | 1.79 |
| (4) | $v_{d1} - v_{d2} > 14$ | 22.1 |
| (5) | $(N_{d3} + N_{d4})/2 > 1.65$ | 1.71 |
| (6) | $v_{d4} - v_{d5} > 20$ | 26.4 |

FIGS. 4A–4D show the spherical aberration, astigmatism, distortion, and lateral color, respectively, of the zoom lens of Embodiment 2 at the wide-angle end. FIGS. 5A–5D show the spherical aberration, astigmatism, distortion, and lateral color, respectively, of the zoom lens of Embodiment 2 at the telephoto end. For this embodiment, as shown in FIG. 4A, at the wide-angle end, the f-number, denoted as FNo., is 2.90 and, as shown in FIGS. 4B–4D, the half-field angle ω is 32.0°. Additionally, for this embodiment, as shown in FIG. 5A, at the telephoto end, the f-number, denoted as FNo., is 5.08 and, as shown in FIGS. 5B–5D, the half-field angle ω is 12.4°. In FIGS. 4A and 5A, the spherical aberration is shown for the d-line (λ=587.6 nm), the F-line (λ=486.1 nm), and the C-line (λ=656.3 nm). In FIGS. 4B and 5B, the astigmatism is shown at the d-line (λ=587.6 nm) for both the sagittal image surface S and the tangential image surface T. In FIGS. 4C and 5C, distortion is measured at the d-line (λ=587.6 nm). In FIGS. 4D and 5D, the lateral color is shown at the F-line (λ=486.1 nm), and the C-line (λ=656.3 nm) relative to the d-line (λ=587.6 nm). As is apparent from these figures, the various aberrations are favorably corrected over the entire zoom range.

As shown in Tables 1 and 5 above, in Embodiments 1 and 2 above, both surfaces S1 and S2 of the first lens element L1, which is in the first lens group G1, both surfaces S6 and S7 of the third lens element L3, which is the object-side lens element of the second lens group G2, and both surfaces S11 and S12 of the sixth lens element L6, which is the image-side lens element of the second lens group G2, are aspheric surfaces.

Also, as described above, each of Embodiments 1 and 2 satisfy all of Conditions (1)–(6). In particular, Condition (2), namely, $0.25<f_2/f_3<0.45$ is satisfied with $f_2/f_3$ being 0.23 and 0.33 in Embodiments 1 and 2, respectively. In contrast, in the zoom lens described in Japanese Laid-Open Patent Application 2002-196240, discussed above, the minimum value of $f_2/f_3$ for this zoom lens is 0.58, which is well above the upper limit of Condition (2). Thus, the eccentric sensitivity of Embodiments 1 and 2 of the present invention is smaller than that of the zoom lens of Japanese Laid-Open Patent Application 2002-196240.

The ratio of the focal length of the zoom lens at the wide-angle end, $f_w$, divided by the focal length $f_3$ of the third lens group G3, is a measure of the eccentric sensitivity of the zoom lens. This value is a minimum of 0.32 in the zoom lens described in Japanese Laid-Open Patent Application 2002-196240, and the value is 0.19 in each of Embodiments 1 and 2 of the present invention. Therefore, it is clear that the eccentric sensitivity in Embodiments 1 and 2 of the present invention is significantly less than in the zoom lens of Japanese Laid-Open Patent Application 2002-196240.

As is clear from the above descriptions of Embodiments 1 and 2 and the accompanying tables and figures, the zoom lens of Embodiments 1 and 2 of the present invention provides a substantial zoom ratio while maintaining a bright image and enables reducing the entire length of the zoom lens while achieving excellent correction of aberrations.

The present invention is not limited to the aforementioned embodiments, as it will be obvious that various alternative implementations are possible. For example, the number of lens elements and lens components, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Additionally, although in each of the above-mentioned embodiments both surfaces of the first lens element L1 of the first lens group G1 are aspheric surfaces, alternate designs can be adopted, such as one surface of the first lens element L1 and one surface of the second lens element L2 can be aspheric or both surfaces of the second lens element L2 can be aspheric. In each case, the requirement that at least two surfaces of the first lens group G1 be aspheric is satisfied.

Furthermore, in each of the above-mentioned embodiments, in lens group G2, both surfaces of the third lens element L3, closest to the object side, and both surfaces of the sixth lens element L6, closest to the image side, are aspheric surfaces. However, only two aspheric lens surfaces are required in the second lens group G2. For example, one surface of the third lens element L3 and one surface of the sixth lens element L6, a total of only two surfaces, may be aspheric or, alternatively, one surface of the third lens element L3 and both surfaces of the sixth lens element L6 may be aspheric. As a further alternative, both surfaces of the third lens element L3 and one surface of the sixth lens element L6 may be aspheric. In addition, other combinations of aspheric lens surfaces may variously satisfy the requirement that at least two lens surfaces be aspheric.

Such variations, as described above, are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens comprising three lens groups, in order from the object side, as follows:

a first lens group of negative refractive power;

a second lens group of positive refractive power; and a third lens group of positive refractive power;

wherein the first lens group includes, in order from the object side, a lens element of negative refractive power and a lens element of positive refractive power;

the second lens group includes a lens component of positive refractive power, a lens component that includes a first lens element of positive refractive power that is intimately bonded to a second lens element of negative refractive power, a lens component of negative refractive power, and a stop for controlling the amount of light that passes through the zoom lens;

the distance between the third lens group and an image plane of the zoom lens remains substantially constant during zooming while the zoom lens is focused at infinity, the third lens group includes a lens component having positive refractive power, and the third lens group moves toward the object side from a reference position during focusing from infinity to a near point;

at least two lens surfaces of each of the first and second lens groups are aspheric;

the first and second lens groups are moved so that the first and second lens groups become closer together and so that the second and third lens groups become farther apart during zooming from the wide-angle end to the telephoto end;

and the following conditions are satisfied:

$$0.4 < f_w/|f_1| < 0.6$$

$$0.25 < f_2/f_3 < 0.45$$

where $f_w$ is the focal length of the zoom lens at the wide-angle end, $f_1$ is the focal length of the first lens group, $f_2$ is the focal length of the second lens group, and $f_3$ is the focal length of the third lens group.

2. The zoom lens of claim 1, wherein:

said lens element having negative refractive power of the first lens group has an image-side lens surface that is concave and has at least one aspheric lens surface;

said lens element having positive refractive power of the first lens group has a meniscus shape with its convex lens surface on the object side;

and the following conditions are satisfied:

$$N_{d1} > 1.72$$

$$v_{d1} - v_{d2} > 14$$

where $N_{d1}$ is the refractive index at the d-line ($\lambda$=587.6 nm) of the lens material of said lens element having negative refractive power of the first lens group, $v_{d1}$ is the Abbe number at the d-line ($\lambda$=587.6 nm) of the lens material of said lens element having negative refractive power of the first lens group, and $v_{d2}$ is the Abbe number at the d-line ($\lambda$=587.6 nm) of the lens material of said lens element having positive refractive power of the first lens group.

3. The zoom lens of claim 1, wherein each of the object-side lens surface and the image-side lens surface of said lens element having negative refractive power of the first lens group is aspheric.

4. The zoom lens of claim 2, wherein each of the object-side lens surface and the image-side lens surface of said lens element having negative refractive power of the first lens group is aspheric.

5. The zoom lens of claim 3, wherein:

said second lens group includes a lens element that has positive refractive power, that has at least one aspheric lens surface, and that is situated on the object side of all other lens elements of the second lens group;

said second lens group includes a lens element that has negative refractive power, that has at least one aspheric lens surface, that is situated on the image side of the second lens group, and that has a concave lens surface on its image side;

said stop is situated on the object side of the second lens group;

and the following conditions are satisfied:

$$(N_{d3} + N_{d4})/2 > 1.65$$

$$v_{d4} - v_{d5} > 20$$

where $N_{d3}$ is the refractive index at the d-line ($\lambda$=587.6 nm) of the lens material of the lens element having positive refractive power of the second lens group that is situated closest to the object side, $N_{d4}$ is the refractive index at the d-line ($\lambda$=587.6 nm) of the lens material of the lens element of positive refractive power in the second lens group that is intimately bonded to a lens element of negative refractive power, $v_{d4}$ is the Abbe number at the d-line ($\lambda$=587.6 nm) of the lens material of the lens element of positive refractive power in the second lens group that is intimately bonded to a lens element of negative refractive power, and $v_{d5}$ is the Abbe number at the d-line ($\lambda$=587.6 nm) of the lens material of the second lens element in the second lens group that is intimately bonded.

6. The zoom lens of claim 5, wherein both lens surfaces of the image-side lens element of the second lens group are aspheric.

7. The zoom lens of claim 1, wherein the first lens group consists of two lens components.

8. The zoom lens of claim 7, wherein the first lens group consists of two lens elements.

9. The zoom lens of claim 1, wherein the second lens group includes only three lens components.

10. The zoom lens of claim 9, wherein the second lens group includes only four lens elements.

11. The zoom lens of claim 1, wherein the third lens group consists of one lens component.

12. The zoom lens of claim 11, wherein the third lens group consists of one lens element.

13. The zoom lens of claim 7, wherein the second lens group includes only three lens components, and the third lens group consists of one lens component.

14. The zoom lens of claim 1, wherein the zoom lens is formed of only three lens groups.

15. The zoom lens of claim 2, wherein the zoom lens is formed of only three lens groups.

16. The zoom lens of claim 3, wherein the zoom lens is formed of only three lens groups.

17. The zoom lens of claim 4, wherein the zoom lens is formed of only three lens groups.

18. The zoom lens of claim 5, wherein the zoom lens is formed of only three lens groups.

19. The zoom lens of claim 7, wherein the zoom lens is formed of only three lens groups.

20. The zoom lens of claim 14, wherein the first lens group consists of two lens components, the second lens group includes only three lens components, and the third lens group consists of one lens component.

* * * * *

UNITED STATES PATENT AND TRADEMARK OFFICE
CERTIFICATE OF CORRECTION

PATENT NO. : 6,919,994 B2 Page 1 of 1
DATED : July 19, 2005
INVENTOR(S) : Tanaka It is certified that error appears in the above-identified patent and that said Letters Patent is hereby corrected as shown below:

<u>Column 11,</u>
Line 66, change "0.23" to -- 0.32 --.

Signed and Sealed this

Twenty-seventh Day of September, 2005

JON W. DUDAS
*Director of the United States Patent and Trademark Office*